(12) United States Patent
Maguire

(10) Patent No.: US 10,131,506 B2
(45) Date of Patent: Nov. 20, 2018

(54) SELECTIVE MATRIX CONVEYANCE APPARATUS AND METHODS FOR GRANULAR RESIN MATERIAL

(71) Applicant: Maguire Products, Inc., Aston, PA (US)

(72) Inventor: Stephen B. Maguire, West Chester, PA (US)

(*) Notice: Subject to any disclaimer, the term of this patent is extended or adjusted under 35 U.S.C. 154(b) by 0 days.

(21) Appl. No.: 14/963,282

(22) Filed: Dec. 9, 2015

(65) Prior Publication Data

US 2016/0158967 A1    Jun. 9, 2016

Related U.S. Application Data

(60) Provisional application No. 62/089,389, filed on Dec. 9, 2014.

(51) Int. Cl.
*B65G 53/46* (2006.01)
*B65G 53/26* (2006.01)
*B65G 23/44* (2006.01)

(52) U.S. Cl.
CPC ............. *B65G 53/26* (2013.01); *B65G 23/44* (2013.01)

(58) Field of Classification Search
CPC ................................. B65G 53/46; B65G 53/26
USPC ............................................ 406/1, 125, 126
See application file for complete search history.

(56) References Cited

U.S. PATENT DOCUMENTS

| | | | |
|---|---|---|---|
| 1,001,510 A | 8/1911 | Curbey | |
| 1,418,096 A | 5/1922 | Royer | |
| 1,579,251 A | 4/1926 | Schossow | |
| 2,116,912 A | 5/1938 | Richardson | |
| 2,161,190 A | 6/1939 | Paull | |
| 2,351,035 A | 6/1944 | Grant, Jr. | |
| 2,403,689 A | 7/1946 | Sprague | |
| 2,601,654 A | 6/1952 | Wright | |
| 2,655,934 A | 10/1953 | Charles | |
| 2,718,435 A | 9/1955 | Hudspeth | |
| 2,765,812 A | 10/1956 | Werner | |
| 2,917,077 A | 12/1959 | Ziege | |
| 3,111,115 A | 11/1963 | Best | |
| 3,115,276 A | 12/1963 | Johanningmeier | |
| 3,122,162 A | 2/1964 | Sands | |
| 3,151,628 A | 10/1964 | Heckert | |
| 3,164,141 A | 1/1965 | Jones | |
| 3,209,898 A | 10/1965 | Beebe et al. | |
| 3,239,278 A | 3/1966 | Mueller | |
| 3,348,848 A | 10/1967 | Lucking et al. | |
| 3,367,362 A | 2/1968 | Hoffman | |
| 3,381,708 A | 5/1968 | Chenoweth | |

(Continued)

FOREIGN PATENT DOCUMENTS

| CN | 202302166 U | 7/2012 |
|---|---|---|
| DE | 3541532 A1 | 5/1986 |

(Continued)

OTHER PUBLICATIONS

Written Opinion for PCT Application No. PCT/US2016/12411, dated Mar. 2, 2016.

(Continued)

*Primary Examiner* — Joseph A Dillon, Jr.
(74) *Attorney, Agent, or Firm* — Fox Rothschild LLP

(57) ABSTRACT

An apparatus for conveying granular resin material from one or more supplies to a receptacle adjustably selected from a plurality of receptacles.

1 Claim, 5 Drawing Sheets

(56) References Cited

U.S. PATENT DOCUMENTS

| | | |
|---|---|---|
| 3,434,493 A | 3/1969 | Owens |
| 3,468,338 A | 9/1969 | Patterson |
| 3,470,994 A | 10/1969 | Schnell et al. |
| 3,621,873 A | 11/1971 | Kenann |
| 3,667,087 A | 6/1972 | Dakin |
| 3,735,777 A | 5/1973 | Katzer et al. |
| 3,773,300 A | 11/1973 | Hauser |
| 3,794,077 A | 2/1974 | Fanshier |
| 3,861,830 A | 1/1975 | Johnson |
| 3,872,884 A | 3/1975 | Busdiecker |
| 3,931,953 A | 1/1976 | Allen |
| 3,951,461 A | 4/1976 | De Feudis |
| 3,959,636 A | 5/1976 | Johnson et al. |
| 3,985,262 A | 10/1976 | Nauta |
| 4,005,908 A | 2/1977 | Freeman |
| 4,026,442 A | 5/1977 | Orton |
| 4,108,334 A | 8/1978 | Moller |
| 4,148,100 A | 4/1979 | Moller |
| 4,174,731 A | 11/1979 | Sturgis |
| 4,183,467 A | 1/1980 | Sheraton |
| 4,219,136 A | 8/1980 | Williams et al. |
| 4,221,510 A | 9/1980 | Smith |
| 4,262,878 A | 4/1981 | O'ffill |
| 4,269,223 A | 5/1981 | Carter et al. |
| 4,284,261 A | 8/1981 | Benjamin |
| 4,294,020 A | 10/1981 | Evans |
| 4,342,443 A | 8/1982 | Wakeman |
| 4,354,622 A | 10/1982 | Wood |
| 4,373,838 A | 2/1983 | Foreman |
| 4,402,436 A | 9/1983 | Hellgren |
| 4,402,635 A | 9/1983 | Maruo |
| 4,454,943 A | 6/1984 | Moller |
| 4,475,672 A | 10/1984 | Whitehead |
| 4,498,783 A | 2/1985 | Rudolph |
| 4,501,518 A | 2/1985 | Smith |
| 4,508,091 A | 4/1985 | Wakeman |
| 4,511,291 A | 4/1985 | Quates, Sr. |
| 4,525,071 A | 6/1985 | Horowitz et al. |
| 4,581,704 A | 4/1986 | Mitsukawa |
| 4,586,854 A | 5/1986 | Newman |
| 4,705,083 A | 11/1987 | Rossetti |
| 4,756,348 A | 7/1988 | Moller |
| 4,793,711 A | 12/1988 | Ohlson |
| 4,812,086 A | 3/1989 | Kopernicky |
| 4,830,508 A | 5/1989 | Higuchi et al. |
| 4,834,385 A * | 5/1989 | Jackson ............... G07C 15/001 273/144 A |
| 4,842,198 A | 6/1989 | Chang |
| 4,848,534 A | 7/1989 | Sandwall |
| 4,850,703 A | 7/1989 | Hanaoka et al. |
| 4,962,831 A | 10/1990 | Dundas |
| 4,995,422 A | 2/1991 | Chew |
| 5,011,043 A | 4/1991 | Whigham |
| 5,054,965 A | 10/1991 | Clark |
| 5,110,521 A | 5/1992 | Moller |
| 5,116,547 A | 5/1992 | Tsukahara et al. |
| 5,132,897 A | 7/1992 | Allenberg |
| 5,143,166 A | 9/1992 | Hough |
| 5,147,152 A | 9/1992 | Link |
| 5,148,943 A | 9/1992 | Moller |
| 5,172,489 A | 12/1992 | Moller |
| 5,225,210 A | 7/1993 | Shimoda |
| 5,232,314 A | 8/1993 | Hopkins |
| 5,244,179 A | 9/1993 | Wilson |
| 5,252,008 A | 10/1993 | May, III et al. |
| 5,261,743 A | 11/1993 | Moller |
| 5,285,930 A | 2/1994 | Nielsen |
| 5,294,154 A * | 3/1994 | Le Devehat ........... B65G 53/56 285/179 |
| 5,340,949 A | 8/1994 | Fujimura et al. |
| 5,341,961 A | 8/1994 | Hausam |
| 5,378,089 A | 1/1995 | Law |
| 5,415,321 A * | 5/1995 | Gehlert ................. B65B 39/005 221/200 |
| 5,423,455 A | 6/1995 | Ricciardi et al. |
| 5,505,496 A * | 4/1996 | Nishida ................... B67D 7/78 285/120.1 |
| 5,575,309 A | 11/1996 | Connell |
| 5,575,596 A | 11/1996 | Bauer |
| 5,613,516 A | 3/1997 | Landrum |
| 5,651,401 A | 7/1997 | Cados |
| 5,669,265 A | 9/1997 | Adler |
| 5,704,391 A | 1/1998 | McGowan et al. |
| 5,767,453 A | 6/1998 | Wakou et al. |
| 5,767,455 A | 6/1998 | Mosher |
| 5,780,779 A | 7/1998 | Kitamura et al. |
| 5,791,830 A | 8/1998 | Fort |
| 5,794,789 A * | 8/1998 | Payson .................... B07C 3/00 209/549 |
| 5,843,513 A | 12/1998 | Wilke et al. |
| 6,007,236 A | 12/1999 | Maguire |
| 6,036,407 A | 3/2000 | Nester |
| 6,076,803 A | 6/2000 | Johnson |
| 6,085,777 A | 7/2000 | Welker |
| 6,089,794 A | 7/2000 | Maguire |
| 6,102,629 A | 8/2000 | Ishida |
| 6,152,656 A | 11/2000 | Curtis et al. |
| 6,158,363 A | 12/2000 | Memory et al. |
| 6,199,583 B1 | 3/2001 | Iacovella |
| 6,227,768 B1 | 5/2001 | Higuchi |
| 6,379,086 B1 | 4/2002 | Goth |
| 6,386,800 B1 | 5/2002 | van Eyck |
| 6,413,020 B1 | 7/2002 | Davison |
| 6,419,418 B1 * | 7/2002 | Smith ...................... B60P 1/16 239/656 |
| 6,447,215 B1 | 9/2002 | Wellmar |
| 6,497,083 B1 * | 12/2002 | Garwood ............... B65B 39/14 221/93 |
| 6,585,004 B1 | 7/2003 | Porter |
| 6,588,988 B2 | 7/2003 | Zlotos |
| 6,634,375 B2 | 10/2003 | Olivas |
| 6,644,345 B2 | 11/2003 | Dulin |
| 6,648,558 B1 | 11/2003 | Shultz |
| 6,786,681 B2 | 9/2004 | Grasshoff |
| 6,834,755 B2 * | 12/2004 | Jay .......................... B65B 23/14 198/418.6 |
| 6,871,618 B2 | 3/2005 | Masse |
| 6,890,129 B2 | 5/2005 | Fabbri |
| 6,923,601 B2 | 8/2005 | Goth |
| 6,942,133 B2 | 9/2005 | Frankeberger |
| 6,981,619 B2 | 1/2006 | Moretto |
| 7,066,689 B2 | 6/2006 | Maguire |
| 7,080,960 B2 | 7/2006 | Burnett |
| 7,114,889 B2 | 10/2006 | Kanou |
| 7,117,886 B2 | 10/2006 | Kajitani |
| 7,137,729 B2 | 11/2006 | Moretto |
| 7,188,434 B2 | 3/2007 | Moretto |
| 7,191,807 B2 | 3/2007 | DeMaison |
| 7,192,222 B2 | 3/2007 | Van Mullekom |
| 7,231,927 B2 | 6/2007 | Suehara |
| 7,311,474 B1 | 12/2007 | Ogasahara |
| 7,318,459 B2 | 1/2008 | Frankeberger |
| 7,384,018 B2 | 6/2008 | Moretto |
| 7,472,494 B2 | 1/2009 | Moretto |
| 7,503,128 B2 | 3/2009 | Moretto |
| 7,662,211 B2 | 2/2010 | Federico |
| 7,766,037 B2 | 8/2010 | Moenkhaus |
| 7,766,305 B2 | 8/2010 | Kim |
| 8,021,462 B2 | 9/2011 | Moretto |
| D650,888 S | 12/2011 | Moretto |
| 8,070,844 B2 | 12/2011 | Maguire |
| 8,092,070 B2 | 1/2012 | Maguire |
| 8,113,745 B2 | 2/2012 | Aoki |
| D671,563 S | 11/2012 | Moretto |
| D671,564 S | 11/2012 | Moretto |
| 8,322,951 B2 | 12/2012 | Kvalheim |
| 8,360,691 B2 | 1/2013 | Moretto |
| 8,412,383 B2 | 2/2013 | Moretto |
| 8,408,228 B1 | 4/2013 | Jimenez |
| D688,711 S | 8/2013 | Moretto |
| 8,672,194 B2 | 3/2014 | Moretto |
| 8,753,432 B2 | 6/2014 | Maguire |
| 8,763,273 B2 | 7/2014 | Moretto |
| 8,793,900 B2 | 8/2014 | Moretto |

(56) References Cited

U.S. PATENT DOCUMENTS

| | | | |
|---|---|---|---|
| D718,791 S | 12/2014 | Moretto | |
| 8,905,681 B2 | 12/2014 | Schneider | |
| 8,914,990 B2 | 12/2014 | Moretto | |
| 9,181,044 B1 | 11/2015 | Baker | |
| 9,365,367 B2 | 6/2016 | Kraemer | |
| 9,371,198 B2 | 6/2016 | Maguire | |
| 9,459,183 B1 | 10/2016 | Schnakenberg | |
| 9,550,635 B2 | 1/2017 | Maguire | |
| 9,550,636 B2 | 1/2017 | Maguire | |
| 9,604,793 B2 | 3/2017 | Maguire | |
| 9,637,320 B2 | 5/2017 | Moretto | |
| 9,663,263 B2 | 5/2017 | Moretto | |
| 2002/0061232 A1 | 5/2002 | Zlotos | |
| 2002/0136609 A1 | 9/2002 | Maguire | |
| 2003/0168618 A1 | 9/2003 | Coney | |
| 2004/0115013 A1 | 6/2004 | Goth | |
| 2004/0221893 A1 | 11/2004 | Johnson | |
| 2005/0012058 A1 | 1/2005 | Medina | |
| 2005/0039816 A1 | 2/2005 | Maguire | |
| 2005/0089378 A1 | 4/2005 | Gerber | |
| 2005/0265793 A1 | 12/2005 | Van Mullekom | |
| 2008/0314461 A1 | 12/2008 | Moretto | |
| 2009/0031580 A1 | 2/2009 | Moretto | |
| 2009/0039106 A1 | 2/2009 | Moretto | |
| 2009/0090018 A1 | 4/2009 | Moretto | |
| 2009/0151800 A1 | 6/2009 | Salmento | |
| 2009/0295016 A1 | 12/2009 | Shinohara | |
| 2011/0211919 A1 | 9/2011 | Rasner | |
| 2011/0299943 A1 | 12/2011 | Woolever | |
| 2012/0201917 A1 | 8/2012 | Shinohara | |
| 2013/0202370 A1 | 8/2013 | Moretto | |
| 2013/0209180 A1 | 8/2013 | Moretto | |
| 2015/0175282 A1* | 6/2015 | Thompson | B65B 5/103 221/1 |
| 2015/0232287 A1 | 8/2015 | Maguire | |
| 2015/0232289 A1 | 8/2015 | Maguire | |
| 2015/0232290 A1 | 8/2015 | Maguire | |
| 2015/0308584 A1 | 10/2015 | Ehrne | |
| 2015/0321860 A1 | 11/2015 | Maguire | |
| 2016/0096693 A1 | 4/2016 | Hanaoka | |
| 2016/0167897 A1 | 6/2016 | Wiemers | |
| 2016/0244275 A1 | 8/2016 | Maguire | |
| 2016/0272439 A1 | 9/2016 | Kelly | |
| 2016/0280473 A1 | 9/2016 | Veselov | |
| 2016/0292953 A1* | 10/2016 | Brown | G07F 17/0071 |
| 2016/0347557 A1 | 12/2016 | Tell | |
| 2017/0174447 A1 | 6/2017 | Baker | |

FOREIGN PATENT DOCUMENTS

| | | |
|---|---|---|
| DE | 3923241 | 1/1991 |
| DE | 4323295 | 2/1995 |
| EP | 0318170 | 5/1989 |
| EP | 0507689 | 10/1992 |
| EP | 0587085 | 9/1994 |
| EP | 0743149 | 11/1996 |
| FR | 2109840 | 5/1972 |
| FR | 2235775 | 1/1975 |
| FR | 2517087 | 5/1983 |
| GB | 203758 A | 9/1923 |
| GB | 271930 A | 6/1927 |
| GB | 2081687 | 2/1982 |
| JP | 1235604 | 9/1989 |
| JP | 4201522 | 7/1992 |
| JP | 6114834 | 4/1994 |

OTHER PUBLICATIONS

International Search Report for PCT Application No. PCT/US2016/12411, dated Mar. 2, 2016.
Written Opinion for PCT Application No. PCT/US2016/19455, dated May 13, 2016.
International Search Report for PCT Application No. PCT/US2016/19455, dated May 13, 2016.
Introduction to Pneumatic Conveying of Solids, Karl Jacob, The Dow Chemical Company, originally delivered on Sep. 8, 2010.
Sheet of 2 photographs of Mould-Tek gravimetric blender, circa 1993.
Sheet of 2 photographs of Motan gravimetric blender and feeding system with Maguire Products, Inc. controls, circa 1993.
Sheet of 3 photographs of UNA-DYN gravimetric blender, circa 1993.
Sheet of 2 photographs of Maguire Products, Inc. gravimetric blender with Conair hoppers and feeding system, circa 1993.
Sheet of 1 photograph of Hydracolor gravimetric blender, circa 1993.
Advertisement entitled "Machinery and Systems for Extrusion is Our Only Business" by Process Control Corporation, circa 1993.
Advertisement entitled "Weigh Blender Delivers Unmatched Accuracy" by Universal Dynamics, Inc., circa 1993.
Advertisement entitled "A Full Line-up of Blender Solutions . . . Priced Right" by HydReclaim, circla 1993.
Advertisement entitled "New From HydReclaim —Now Processors Can Economically Achieve Continuous Gravimetric Blending" by HydReclaim, circa 1993.
Article entitled "Control Loading Systems" from Plastics Technology, Oct. 1995, p. 41.
Advertisement "Introducing our 400 VME-II Gravimetric Blender" by HydReclaim Corporation, circa 1993.
Four page brochure entitled "Gravimix Better Quality through Research", circa 1993.
Four page brochure entitled "Conomix Plus Volumetric Blender" dated Aug. 1993.
Four page brochure entitled "Conair Franklin Autocolor Y Mezclador" dated Mar. 1995.
Two-sided flyer entitled "GB 140 Series Compact Auto Weigh Blender" published by Conair Franklin in the United States, Jun. 1994.
Six page brochure entitled "Graviblend Precise Continuous Weigh Blenders" published by Ktron Vertech, Jun. 1991, United States.
Six page brochure entitled "Piovan Gravimetric Blenders MDW" published by Piovan Sri, Oct. 1993, Venezia, Italy.
One page two-sided flyer entitled "Gravimix, The New Gravimetric Blending Generation" published by Ferlin, De demsvaard, Holland, circa 1993.
Four page brochure entitled "When you Weigh it All Up . . . " published by Ferlin Trading, Holland, circa 1993.
Thirty-two page catalog entitled "Maguire Color Blending Equipment" published by Maguire Products, Inc., 1993, United States.
Two page brochure entitled "Mould-Tek Bulk Handling Systems" published by Mould-Tek Industries, Inc. in Canada, circa 1993.
Brochure entitled "Plastic Molders and Extruders: published by Maguire Products, Inc., 1995".
Five page brochure entitled "Blending power: GXB Blender the Better Alternative" of Mould-Tek, circa 1998.
Forty-four page two-sided brochure including cover and back pages entitled "Maguire: Auxiliary equipment for the plastics industry" of Maguire Products, Inc., Oct. 2000.
Two-sided color brochure entitled "Convey, Blend, Dry" published by Novatec, Inc., undated.
Three page two-sided color brochure entitled "Accuracy, flexibility and performance are at your fingertips with ConveyPacer III Series "S" Controller" of Mould-tek, 1999.
Seven page two-sided color brochure plus cover entitled "Exac-U-Batch Series Weigh Scale Blenders: Engineered to be the ultimate blend of precision and control!" of Mould-tek, 2000.
Three page two-sided color brochure entitled "We have the building blocks to integrate your entire plastics bulk handling system." of Mould-tek, 1999.
Two page two-sided color brochure entitled "Model GXB-2202 Exac-U-Batch Gravimetric Scale Blender: Accurate weigh scale blending under precise computer control" of Mould-tek, 2000.
One page, two-sided color brochure entitled "Bulk handling power: the manufacturer of the world's most advanced blender gives you the same performance in bulk handling systems" of Mould-Tek, dated Apr. 1999.

(56) References Cited

OTHER PUBLICATIONS

Three page two-sided color brochure entitled "Portable Drying and Conveying Systems: Nomad™ Series Portable Dryers", AEC Whitlock, 1998.
Two page two-sided color brochure entitled "Drying Systems: WD Series Dehumidifying Dryers" of AEC Whitlock, 1997.
19 page document entitled "Model MLS—Clear Vu Eight Component Vacuum Loading System: Operation Manual" of Maguire Products, Inc. dated May 4, 1999.
One page two-sided color brochure entitled "Maguire Clear-Vu™ Loading System" of Maguire Products, Inc.
Four page two-sided color brochure entitled "Novatec Inc. Vacuum Loaders—Electro-Polished Stainless Steel Finish" of Novatec Inc., undated.
Eight page two-sided color brochure entitled "Novatec Inc. Material Conveying Solutions for the Plastics Industry", 1999.
Two page two-sided color brochure entitled Maguire Model MPM Pre-Mixers of Maguire Products, Inc., Apr. 1997.
Two page two-sided color brochure entitled "WDMR Series Compact Dryers" of AEC Whitlock, 1998.
Two page two-sided color reprint entitled "10 most frequently asked questions about Dryers" by Joseph Dziediz, AEC/Whitlock, from Plastics Technology, Jan. 1998.
Two page two-sided color brochure entitled "Drying Systems: WD Series High Capacity Dehumidifying Dryers" of AEC Whitlock, 1997.
Five page two-sided color brochure entitled "AEC Auxiliaries as Primary", AEC, Inc., 1999.

* cited by examiner

SELECTIVE MATRIX CONVEYANCE APPARATUS AND METHODS FOR GRANULAR RESIN MATERIAL

CROSS-REFERENCE TO RELATED PATENT APPLICATION

This patent application claims the benefit of the priority of provisional U.S. patent application Ser. No. 62/089,389 entitled "Apparatus and Methods for Selective Matrix Conveyance of Granular Resin Material" filed on 9 Dec. 2014 in the name of "Paul S. Maguire." The priority of the '389 application is claimed under 35 USC 119 and 35 USC 120.

BACKGROUND OF THE INVENTION

Field of the Invention

This invention relates to methods and apparatus for conveyance of granular resin material, particularly granular plastic resin material, typically within facilities where plastic molding and/or plastic extrusion is performed.

Description of the Prior Art

In the plastics industry, it is common practice to have many molding machines and/or extruders, and many different granular plastic resins, and to use different granular plastic resins for different molding projects and/or extrusion projects. As a result, there is a need to be able to convey the resins to the correct molding machine or extruder.

As an example, a molding facility or an extruding facility may have ten material storage silos located outside of the facility with different types of granular plastic resin in each silo. In the molding or extrusion facility, there may be twenty molding machines or extruders. Clearly there is the need for a system to connect any one of the molding machines or extruders to any one of the granular resin material storage silos.

The most common practice is to fill a large box, conventionally referred to as a "Gaylord", with resin material from one of the silos and to move the Gaylord by using a forklift truck to the desired molding machine or extruder. This is the crudest, most elementary approach. A slightly more sophisticated approach is to convey the granular resin material directly from the silos to the desired molding machine or extruder, with all of the granular plastic resin material passing through a common area where connections can be altered by hand as required. This is done by manually disconnecting and reconnecting conveying conduits, one conduit for each molding machine or extruder, with that conveying conduit connected to the desired silo so that the proper granular resin material can be delivered to a particular molding machine or extruder. This disconnecting and reconnecting of conveying lines is done by hand, much like an old-time telephone operator connecting one's call to the proper destination by plugging a cable into a socket corresponding to the recipient of the call. Manually disconnecting and reconnecting granular resin material conveying lines is labor-intensive and subject to error by the laborers making the connections.

A step up in sophistication from the manual connection of the conveying lines to the molding machines or extruders is to facilitate such connections automatically with computer control.

One approach using computer control is to employ a rotating material selection device, driven by a stepping motor, allowing a single machine to select from one of several granular resin material supply lines. For every molding machine or extruder, there is one such rotating device driven by a stepping motor.

Another approach is to use two rotating devices, one that rotates to select a molding machine or extruder while the second rotating device rotates to select the desired material. The two rotating devices are connected at their centers, much like a set of "Siamese twins." In using this approach, any one of the molding machines or extruders can be selected to receive any of the materials stored in any of the storage silos at the facility. The granular resin material passes into a first one of the rotating devices, which is connected to the selected silo containing the proper granular resin material. This first device transfers the material to the second device as the two devices rotate. The second device has a selected molding machine or extruder destination and parses out the desired material to the correct molding machine or extruder.

No matter what the approach, whether it be manual or automated, to supplying granular plastic resin material to a molding machine or extruder, with such molding machines and extruders being collectively referred to herein as "process machines", granular plastic resin material is furnished to the process machines via "material source lines" that run throughout the plant.

SUMMARY OF THE INVENTION

High pressure air or vacuum, depending on the designer's choice, is available throughout the plant to actuate air cylinders, open gate valves and the like. The high pressure air or vacuum is furnished through "destination lines" that also run throughout the plant.

In the invention, all of the material source lines run vertically through passages, for example, extending up from the floor. All of the material destination lines go horizontally through passageways, running left to right. The horizontal passageways are located immediately behind the vertical ones in a manner to form a matrix of crossings that are referred to as "intersections".

At each intersection is a device that can connect the horizontal passageway with the vertical passageway behind it.

For example, there might be ten types of granular resin materials and twenty process machines. This results in two hundred intersections of a material source line within a destination line. So there are two hundred connection devices, one for each of the intersections, to connect the material source line with the destination line wherever needed at the intersection. The invention provides a very "modular" system, as additional connection devices can be added at any time, to add materials, or to add machine destinations. Each connection device has an air cylinder operated shut off gate, and all of the connection devices are connected to a central computer so that any one or more can be selected and activated at any time. These connection devices are opened in coordination with a vacuum pump and a receiver at a particular process machine, resulting in vacuum therein conveying the material from the correct silo to the correct process machine.

In one of its aspects, this invention provides apparatus for conveying granular resin material from one or more supplies to a receptacle adjustably selected from a plurality of receptacles where the apparatus includes a plurality of resin material feed lines. A plurality of resin material supply lines are provided, each being connected to one of the supplies. The apparatus further includes connection conduits located at positions of closest approach of a feed line to a supply line, with the connection conduit connecting a selected feed line with the closest supply line for granular resin material flow from the feed line to the supply line at the intersection. The apparatus yet further includes shutoff gates for selectably closing a connection conduit between an associated feed line and an associated supply line at an associated position of closest approach of the respective lines.

In this aspect of the invention, at least some of the resin material feed lines are preferably parallel one with another and at least some of the resin material supply lines are preferably at least parallel one with another.

In another aspect of the invention, when the resin material feed lines are parallel with one another, the resin material supply lines are parallel with one another and the resin material feed lines are orthogonal respecting the resin material supply lines. Most desirably the supply lines are vertical and the feed lines are horizontal.

In another one of its aspects, this invention provides apparatus for conveying granular resin material from one or more supplies to one or more receptacles adjustably selected from among a plurality of receptacles where the apparatus includes a plurality of horizontally extending resin material feed lines. A plurality of vertically extending resin material supply passageways are provided, each being connected to one of the supplies. The resin material supply passageways are in close proximity to the feed lines to define positions of close proximity of each feed line with each passageway. A plurality of mechanisms are provided for selectably connecting a passageway to each of the feed lines at a location of close proximity therebetween, where each of the mechanisms includes a pair of spaced apart plates, a segment of an associated feed line extending between the plates of the spaced apart plates, with the segment having an upwardly facing opening. A first plate-like member contacts the plates of the spaced pair, running along first vertically extending edges of the plates remote from the feed line segment. A first guide contacts and extends between the plates of the spaced apart pair at a position between the first plate-like member and the feed line segment, terminating at the feed line segment. A second guide contacts and extends between the plates of the spaced apart pair at a position below the first guide. The second guide terminates at the feed line segment located between the pair of spaced apart plates. A slide gate is moveable through an opening in the first guide proximate to feed line segment to contact the second guide proximate to feed line segment. A piston cylinder combination is provided for moving the slide gate between a position contacting the second guide and thereby blocking access to the segment interior and a position removed from the second guide to selectably provide access to the segment interior. The mechanisms are desirably vertically stacked in position in horizontal rows with mechanisms in each row positioned with their feed line segments aligned to define a feed line at the vertical position of the particular mechanism, with mechanisms at a given horizontal position being vertically aligned and stacked on one another vertically, with their respective pairs of spaced apart plates, first plate-like members, and first guides defining the vertically extending resin material supply passageways.

In yet another one of its aspects, this invention provides a method for conveying granular resin material from one or more supplies to a receptacle adjustably selected from among a plurality of receptacles where the method includes providing a plurality of resin material feed lines. The method further includes the step of providing a plurality of resin material supply lines with each supply line being connected to one of the supplies. The method proceeds by interdigitating the feed lines and the supply lines with one another to form a matrix of feed line-supply line intersections. The method concludes with connecting a feed line to an intersecting supply line for granular resin material flow from the feed line to supply line at the intersection therewith by opening of a shutoff gate between the feed line and the supply line.

DETAILED DESCRIPTION OF THE INVENTION

Figure 1:
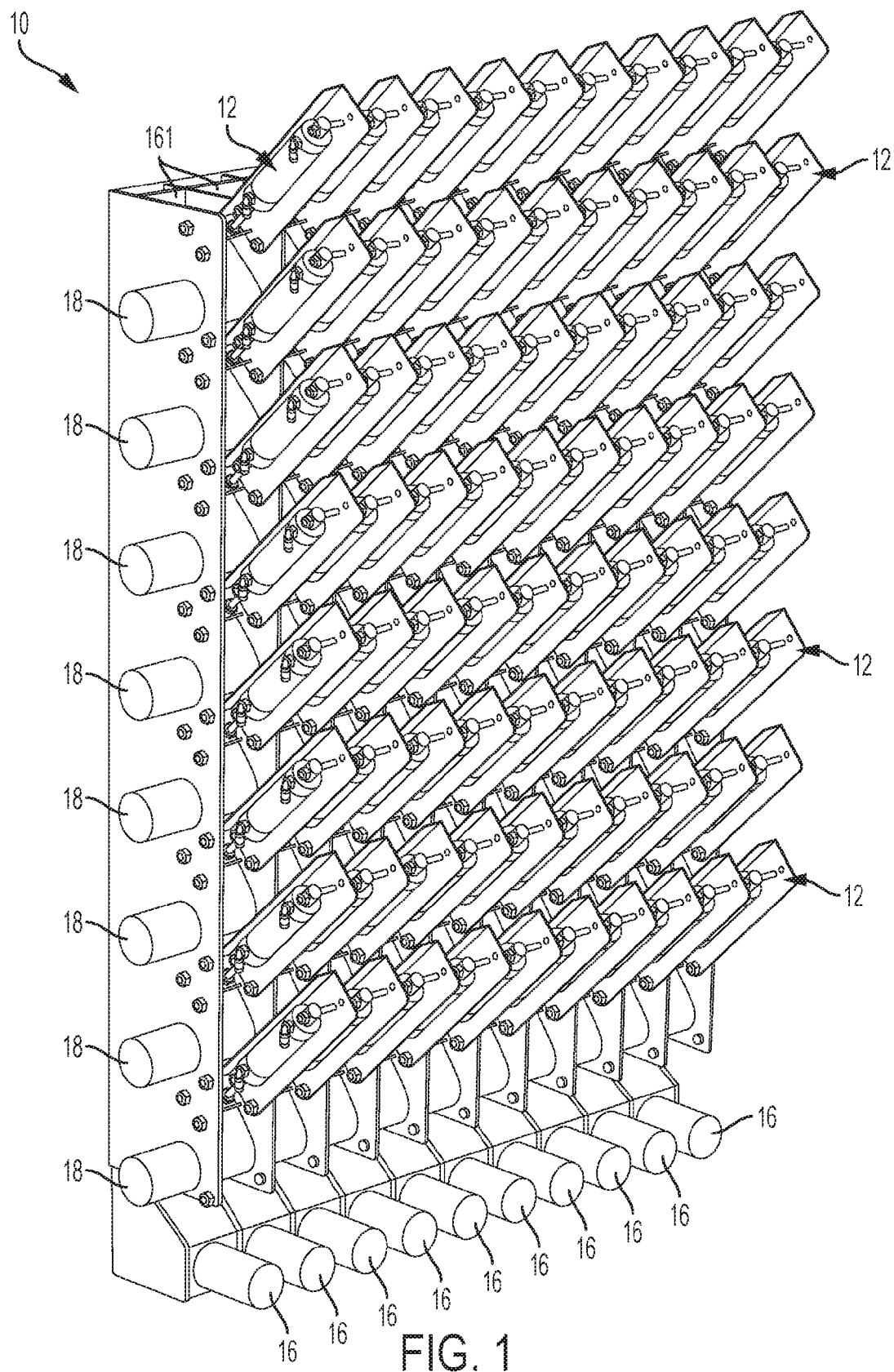
FIG. 1 is an isometric view of the front and left side of a resin material distribution matrix in accordance with the invention.
Figure 2:
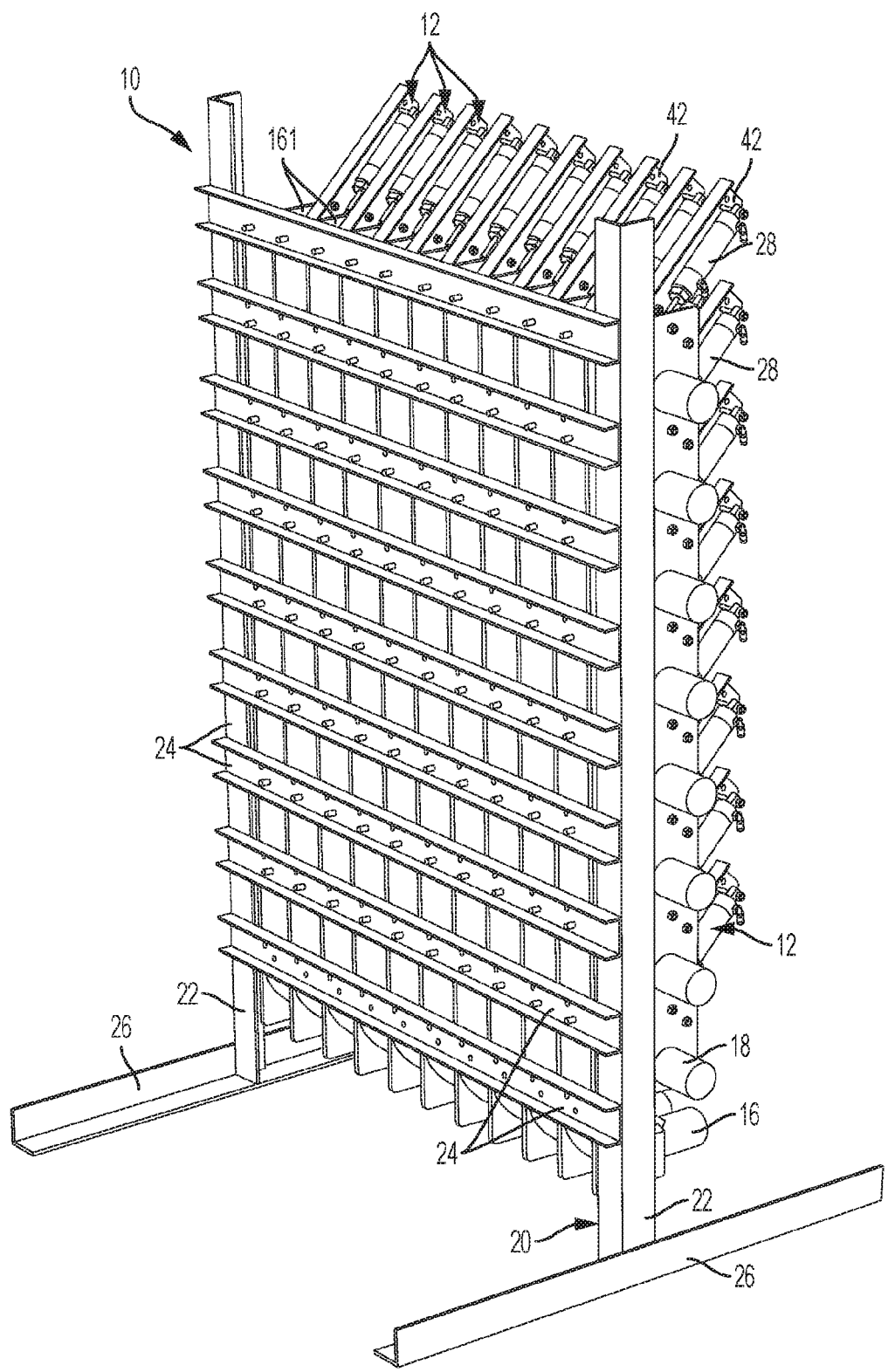
FIG. 2 is an isometric view of the rear and left side of the resin material distribution matrix illustrated in FIG. 1.

Referring to the drawings and particularly to FIGS. 1 and 2, a resin material distribution matrix in accordance with the invention is designated generally 10. Matrix 10 includes a plurality of resin material destination conduits, each of which is designated 18. Resin material destination conduits 18 are horizontally disposed conduits. Only the discharge ends of resin material destination conduits 18 are visible in FIGS. 1 and 2.

Resin material distribution matrix 10 further includes a plurality of resin material source conduits, each of which is designated 16. The upper openings to resin material source conduit 16 are visible in FIG. 2, but only partially in FIG. 1, and are designated 16I in FIGS. 1 and 2.

A plurality of valve stations, each of which is designated generally 12, are provided in resin material distribution matrix 10 with a valve station 12 located at each "intersection" of a resin material source conduit 16 and a resin material destination conduit 18. Each valve station 12 includes a pneumatically actuated valve, described in greater detail below, that when open connects the resin material source conduit at the particular intersection at which the valve station is located with the resin material destination conduit at the particular intersection at which valve station 12 is located.

Resin material distribution matrix 10 further includes a frame designated generally 20 in FIG. 2. Frame 20 includes a pair of uprights 22 that are connected by a plurality of cross-members 24. Uprights 22 extend upwardly from two horizontal footers 26 that provide stability for resin material distribution matrix 10.

Figure 3:
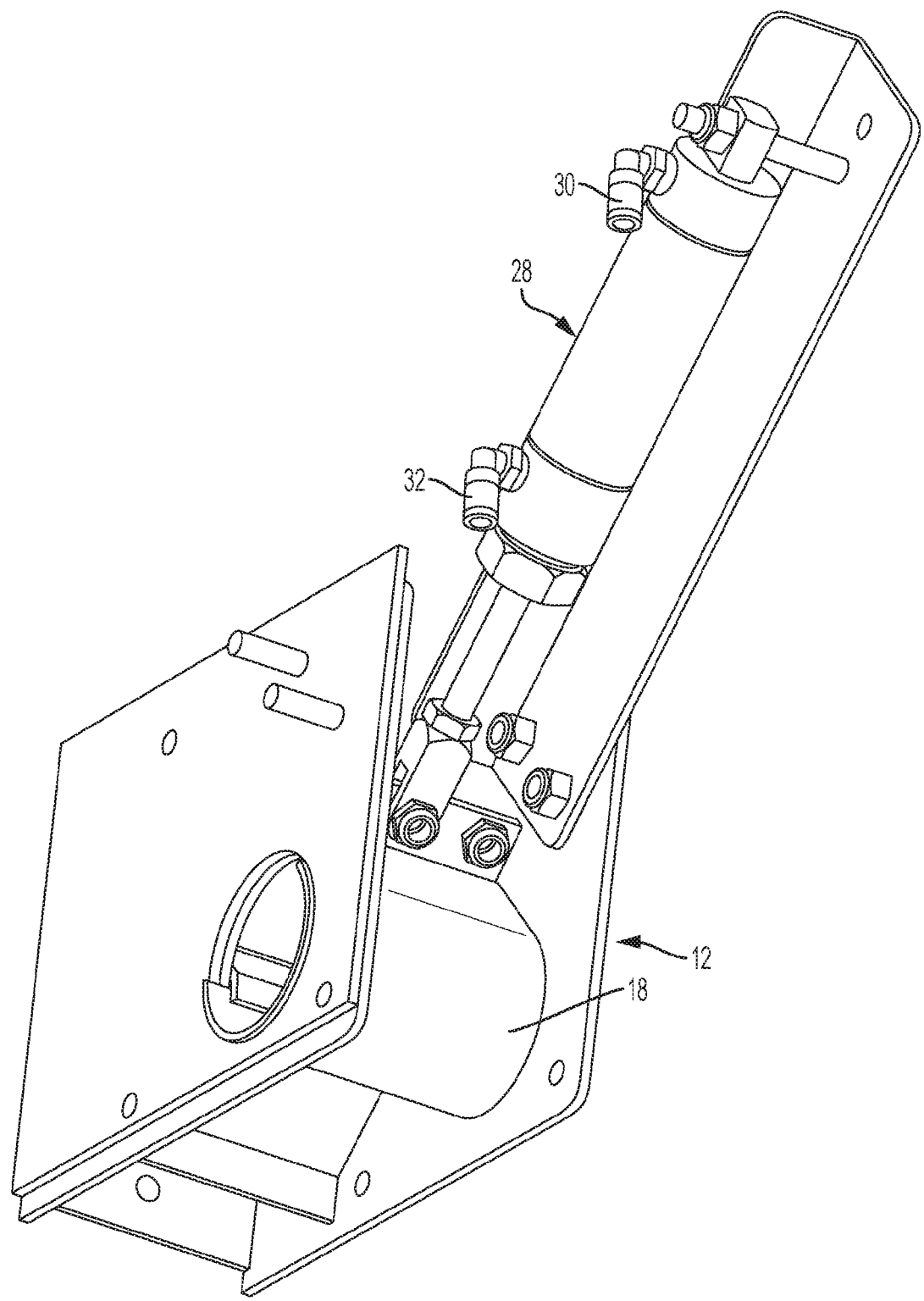
FIG. 3 is a vertical section of a valve station portion of the resin material distribution matrix illustrated in FIGS. 1 and 2.
Figure 4:
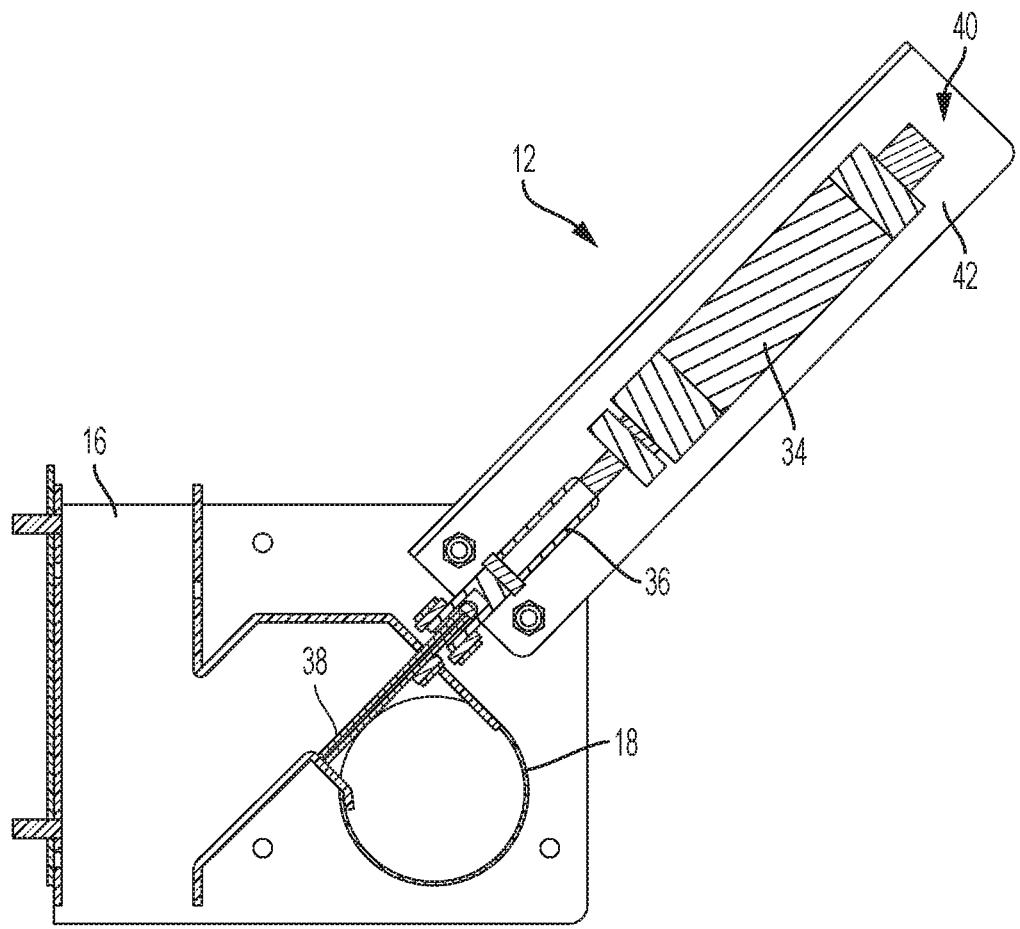
FIG. 4 is sectional view of a valve station portion of the resin material distribution matrix as illustrated in FIG. 3.
Figure 5:
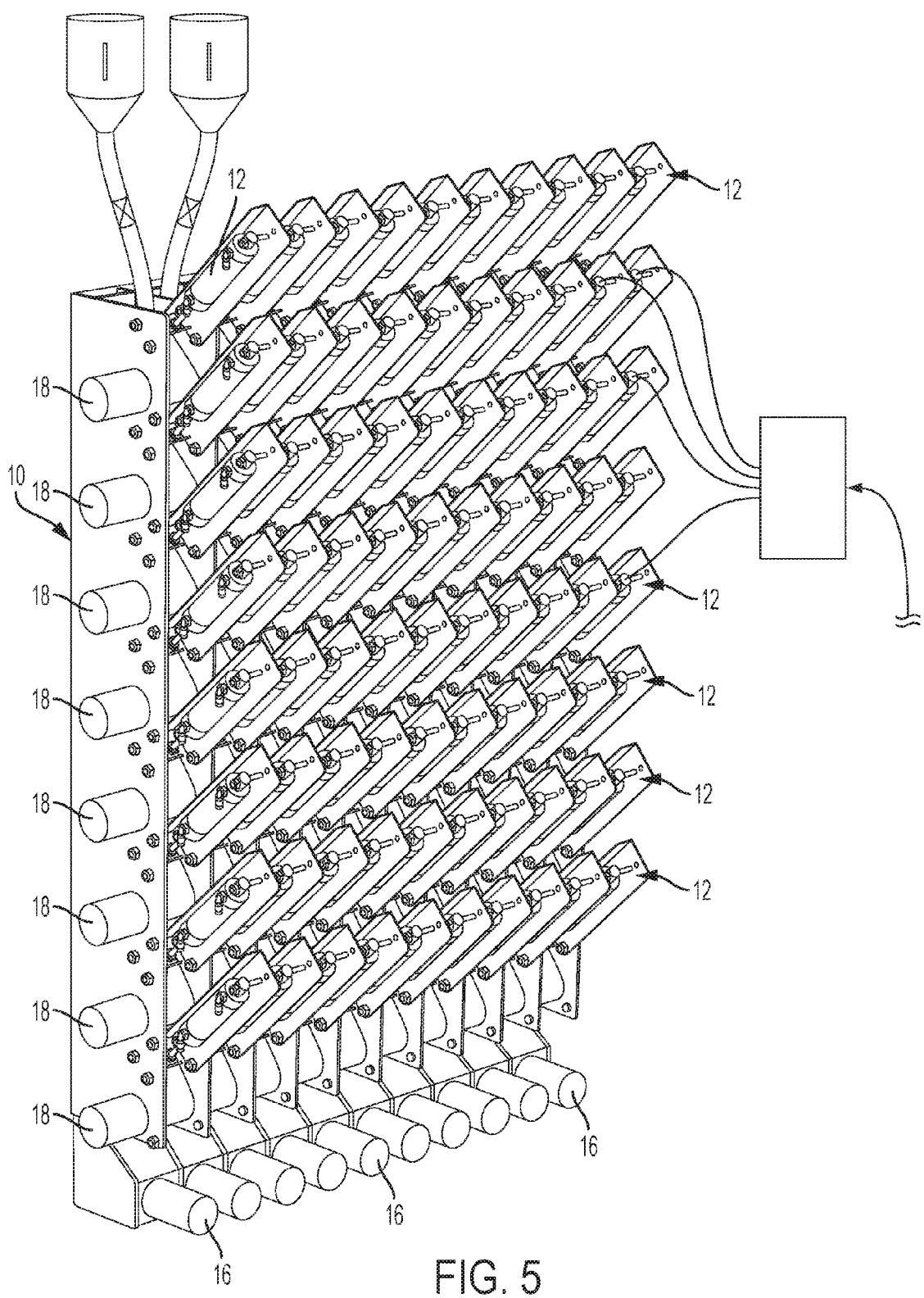
FIG. 5 is a view of a resin material distribution matrix, as shown in FIG. 1, in use, showing two resin hoppers, each with a feed line and a valve in each line, and a microprocessor, with control lines shown connecting to the microprocessor, in accordance with the invention.

Referring now to FIG. 3, a pneumatic cylinder designated generally 28 includes an air inlet nipple 30 via which compressed air is input via a suitable solenoid valve, not illustrated in FIG. 3, to close valve station 12. Pneumatic cylinder 28 further includes a second air inlet nipple designated 32 via which compressed air is supplied to pneumatic cylinder 28 to open valve station 12 by moving piston 34 upwardly and away from a resin material destination conduit 18 illustrated in FIG. 3. Piston 34 includes a piston rod designated 36 which has a valve closure member 38 mounted on the end of piston rod 36. A guard 40 is secured to one side of valve station 12, where the side is designated 42. Guard 40 is maintained in position by bolts or other suitable attachment means to effectuate rigid connection between guard 40 and the side portion of valve station 12.

I claim the following:

1. Apparatus for conveying granular resin material from a plurality of supplies to one or more receptacles adjustably selected from a plurality of receptacles, comprising:
 a. a plurality of horizontally extending feed lines;
 b. a plurality of vertically extending supply passageways, each being connected to one of the supplies;
 c. the passageways being in close proximity to the feed lines to define positions of close proximity of each feed line with each passageway;
 d. a plurality of mechanisms for selectably connecting a passageway to each of the feed lines at a location of close proximity therebetween, each comprising:
  i. a pair of spaced apart plates;
  ii. a segment of an associated feed line extending between the plates of the spaced pair, the segment having an upwardly facing opening;
  iii. a first plate-like member contacting the plates of the spaced pair, running along first vertical extending edges of the plates remote from the segment;
  iv. a first guide contacting and extending between the plates of the spaced pair at a position between the first plate-like member and the segment, terminating at the feed line segment;
  v. a second guide contacting and extending between the plates of the spaced pair at a position below the first guide, terminating at the feed line segment between the pair of spaced apart plates;
  vi. a slide gate movable through an opening in the first guide proximate the feed line segment to contact the second guide proximate the feed line segment;
  vii. a piston-cylinder combination for moving the slide gate between a position contacting the second guide and thereby blocking access to the segment interior and a position removed from the second guide, to selectably provide access to the segment interior;
 e. the mechanisms being vertically stacked and positioned in horizontal rows with mechanisms in each row positioned with their feed line segments aligned to define a feed line at the vertical position of a mechanism, with mechanisms at given horizontal position being vertically aligned and stacked on one another with their respective pairs of spaced apart plates, first plate-like members and first guides defining the vertically extending resin material supply passageways.

* * * * *